United States Patent [19] [11] 4,341,940
Defourny [45] Jul. 27, 1982

[54] MONITORING RESISTANCE WELDING

[75] Inventor: Jacques Defourny, St. Nicolas, Belgium

[73] Assignee: Centre de Recherches Metallurgiques-Centrum voor Research in de Metallurgie, Brussels, Belgium

[21] Appl. No.: 166,617

[22] Filed: Jul. 7, 1980

[30] Foreign Application Priority Data

Jul. 6, 1979 [BE] Belgium .................................. 877559

[51] Int. Cl.³ ............................................. B23K 11/24
[52] U.S. Cl. .................................. 219/117.1; 219/110
[58] Field of Search ...................... 219/109, 110, 117.1

[56] References Cited

U.S. PATENT DOCUMENTS 3,514,569  5/1970  Pfaelzer et al. ...................... 219/110

FOREIGN PATENT DOCUMENTS 1038171 10/1959 France ................................. 219/109
1014133 12/1965 United Kingdom ................ 219/109
1109180  4/1968 United Kingdom .
1259988  1/1972 United Kingdom .
 703270 12/1979 U.S.S.R. ............................... 219/109

Primary Examiner—C. C. Shaw
Attorney, Agent, or Firm—Holman & Stern

[57] ABSTRACT

During each period in which electrical power is supplied to the electrodes one determines whether the weld is subject to flash, by means of an accelerometer on one of the electrode supports. The frequency of occurrence of flash indicates the quality of the welding operation.

9 Claims, 5 Drawing Figures

MONITORING RESISTANCE WELDING

The present invention relates to a method of monitoring resistance welding and apparatus for carrying out the method.

During a welding run it is necessary to maintain the operating conditions in such a way as to enable welds having maximum strength to be obtained.

Maintaining the operating conditions of the resistance welding method may be caarried out by way of the electrical power (welding current), as the other two known parameters, i.e. the electrode pressure and the welding time, are fixed at values according to the application intended (type of products to be welded). The degeneration of the electrodes during production (wear), the re-shaping of these (milling), or their replacement generally require the adaptation of the above-mentioned electrical power. If this is inadequate, the welds will be defective as a result of a strength which is too low or the risk of bonding. Excessive power causes wear of the electrodes which is too rapid and may lead in the case of each weld to the phenomenon to flash which is a phenomenon of temporary instability caused by the ejection of material melted from the interface of the welded sheets, which leads to the risk of deformation of the assemblies provided. These considerations show that the electrical power must be maintained within given limits, although the upper and lower values of these limits may vary during production, for example as a result of the degeneration of the electrodes.

In certain cases, the adaptation of the electrical power to its optimum value many cause difficulties, as it must be carried out without the operator having any objective data in respect of the quality of the weld obtained.

What is required is a means which may be used in industrial mass production and which enables the welding conditions to be maintained, preferably automatically, at their optimum values.

The present invention is based on the observation that, during standard production sequences, such as for example the assembly of automobile bodies, a certain number of welds are subject to the phenomenon of flash. It was deduced from this observation that the frequency of occurrence of this flash could be indicative of the quality of the weld. If the welding power is too low, there is no or very little flash with the risk of bonded spots. If the welding power is too high, all or a large number of weld spots are subject to flash with the risk of deformation as a result of excessive penetration of the electrodes and a loss of material at the weld point.

Consequently, the present invention provides a method in which, during the actual welding phase, the weld points which are subject to flash are detected, and the quality of the welds is determined as a function of the frequency of the flash produced during the welding. The welding conditions are adjusted as a result of this, if necessary.

Flash may be detected by measuring the acceleration of at least one of the two electrode supports, preferably in the direction parallel to the axis of the electrode support. In the case in which the acceleration of the two electrode supports is measured, the difference between the accelerations detected is determined in order to obtain the relative acceleration of the two electrode supports, the said relative acceleration being analysed in order to determine the occurrence of flash.

The welding power may be adjusted in such a way as to maintain the percentage of flash-affected welds within given, previously fixed, limits, this adjustment being carried out as follows: the percentage of flash in a certain number of welds is calculated; if this percentage is lower than the lower limit, the electrical power is increased; if the percentage is higher than the upper limit, the electrical power is decreased. This is advantageous in the case of series production in which it is, in practice, impossible to avoid flash resulting from variations in the arrangement of the members being welded or in the condition of the electrodes.

The adjustment of the electrical power is preferably carried out within predetermined limits; cases in which the electrical power has exceeded these limits may be detected by way of alarm signals. A case of this type may occur for example if the electrodes are too small in diameter or too greatly damaged, as flash is then produced as a result of power which is too low.

Preferably, the electrical power is adjusted to the highest possible value, but lower than that causing flash. For this purpose, the electrical power causing flash is calculated from time to time and the working power is fixed at this value decreased by a given safety margin. This is particularly advantageous in the case of very accurate production, such as for example the welding of fuel tanks, in which leak-tightness is an absolute necessity. In such cases, care should be taken to minimise flash.

Another welding parameter which may be adjusted is the welding time. In this case the electrical welding current is discontinued as soon as flash is detected.

When a coated steel is welded, a temporary phenomenon due to the elimination of the coating is caused during the initial part of the welding period (i.e. during the first welding current cycles). This temporary phenomenon does not have to be taken into account in the detection of flash, and for this purpose such detection is delayed for the first welding cycles (from 1 to 5 cycles).

The method of the present invention may conveniently be put into practice by resistance welding apparatus in which at least one accelerometer is fixed to an electrode support of a resistance welding machine, the measuring axis of the accelerometer preferably being parallel to the axis of the electrode support.

An accelerometer may be fixed on the movable electrode support and/or on the fixed electrode support of a stationary welding machine. An accelerometer may also be used with portable welding tongs.

The welding machine may be constituted by a machine for spot, seam, or pulse sequence welding, or a (projection) welding press. Obviously two accelerometers may each be fixed to a respective electrode support.

The accelerometer is advantageously constituted by a piezoelectric system.

The apparatus preferably also comprises electronic means capable of processing the signal from the accelerometer and then either adjusting the electrical welding power or discontinuing the passage of the electrical current.

The invention will be described further, by way of example, with reference to the accompanying drawings, in which.

Figure 1:
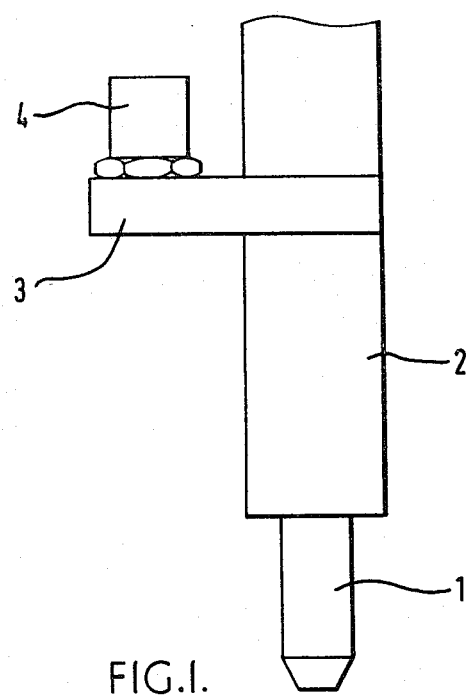
FIG. 1 shows a side view of an accelerometer on an electrode support in resistance welding apparatus of otherwise conventional construction.

In FIG. 1, a welding electrode 1 is mounted on a vertically movable electrode support 2. The support is provided with a fixing flange 3 for an accelerometer 4 designed to measure acceleration in the direction of the axis of the electrode support 2 (vertical direction). This arrangement has the advantages of a simple assembly which occupies little space, as well as a large degree of reliability in detection. The accelerometer is constituted by a piezoelectric system.

Figure 2:
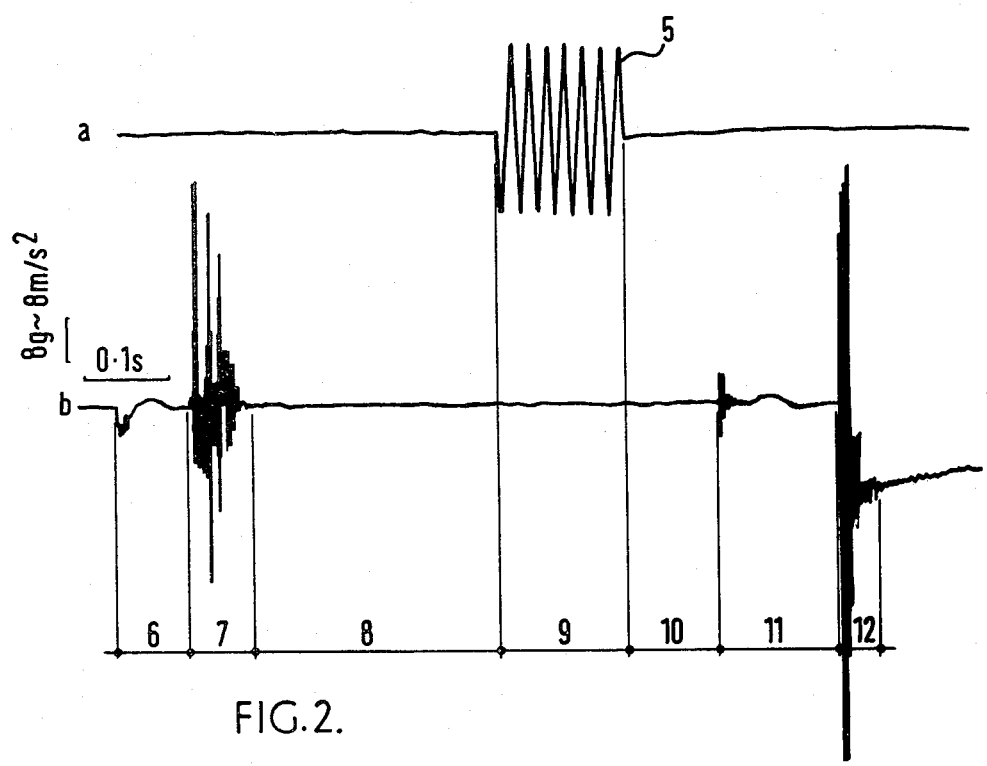
FIG. 2 shows a recording obtained in welding non-coated sheet steel of a thickness of 1 mm, by an accelerometer located on the movable electrode support of a stationary machine, without the occurrence of flash.

In FIG. 2 the upper trace a relates to the welding current and the signals 5 represent the flow of the electrical current (a.c.) during the actual welding period. The lower trace b relates to the accelerations and comprises the following portions:

6 corresponding to the lowering of the electrode support 2;

7 corresponding to the contact of the electrodes with steel sheets to be welded;

8 representing the contact time;

9 representing the welding period; this portion does not contain oscillations: flash was not observed during welding;

10 relates to the holding time after welding;

11 corresponding to the raising of the electrode support 2;

12 relates to the return of the electrode support 2 into the housing of the welding machine.

Figure 3:
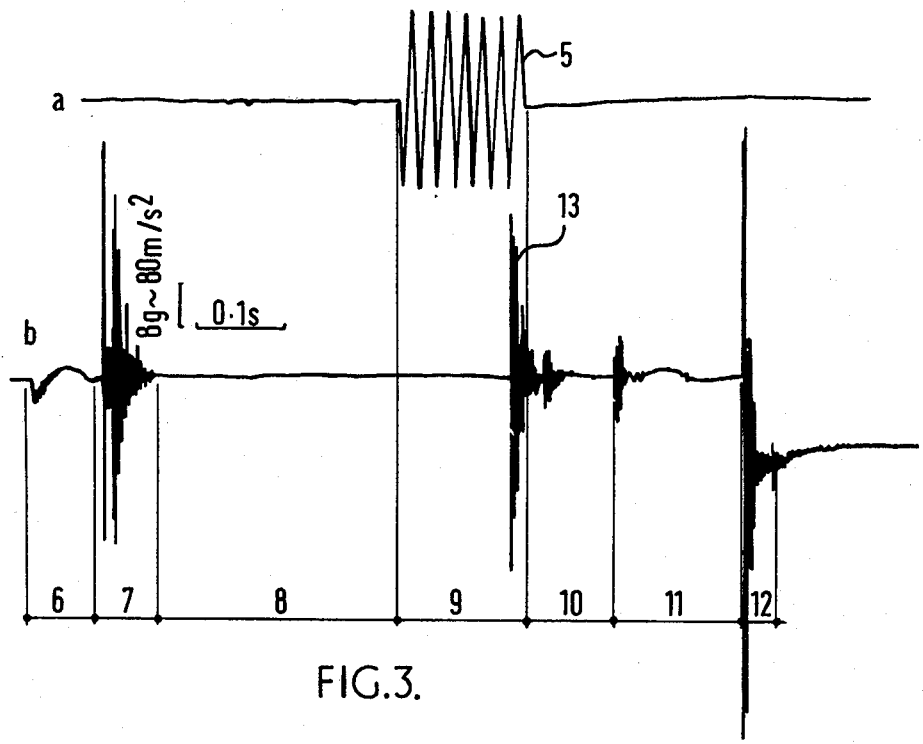
FIG. 3 shows a recording similar to that of FIG. 2, but with the occurrence of flash.

FIG. 3 shows the same features as those of FIG. 2 with the exception that, during the actual welding period 9, an accelerometer signal 13 appears. Flash was therefore observed during the welding of the steel in question.

Figure 4:
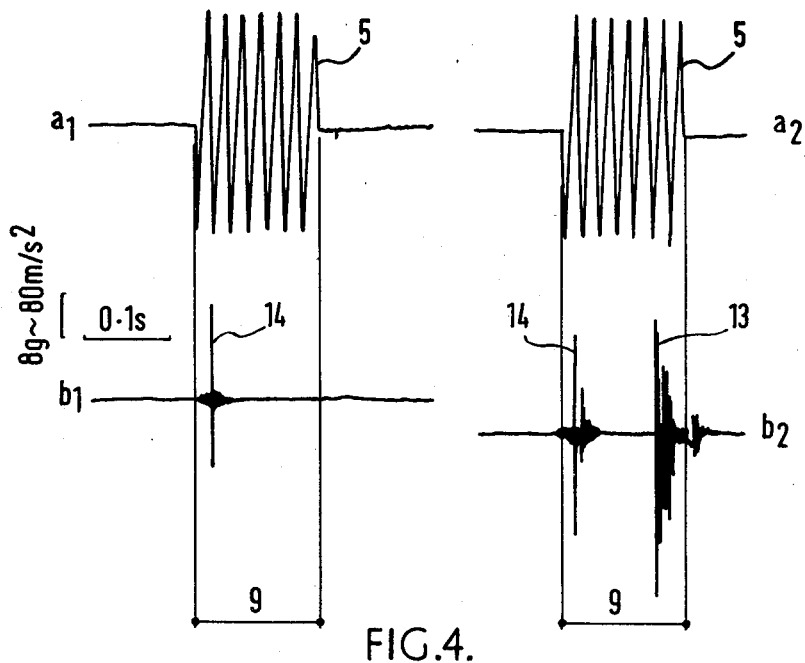
FIG. 4 shows to recordings obtained by an accelerometer, in welding sheet steel of a thickness of 0.6 mm, coated with a mixture of zinc and aluminium, showing solely two welding periods, flash occurring only in the second period.

In FIG. 4, trace $a_1$ relates to the passage of the electrical current during the actual welding period (signals 5) and trace $b_1$ relates to the recording of the accelerometer, in the welding of a coated steel. The recorded signal 14 does not indicate flash but a temporary phenomenon caused by the elimination of the coating during the initial welding cycles.

Traces $a_2$ and $b_2$ relate to the welding of a coated steel with the phenomenon of flash during the welding period. This flash is indicated by the signal 13 of the accelerometer. As in the trace $b_1$, the signal 14 indicates a phenomenon due to the elimination of the coating during the first welding cycles.

So as not to take into account this temporary phenomenon, as stated above, the detection of the accelerometer is disregarded during the first welding cycles (from 1 to 5 cycles).

The field of application of flash detection is enormous and comprises, in particular, in respect of steels:

non-coated steel: mild steel, high tensile steel.

coated steel: galvanized, leaded, electroplated with zinc, conducting paint (for example zincrometal), Zn-Al mixture (galvalume), etc.

Figure 5:
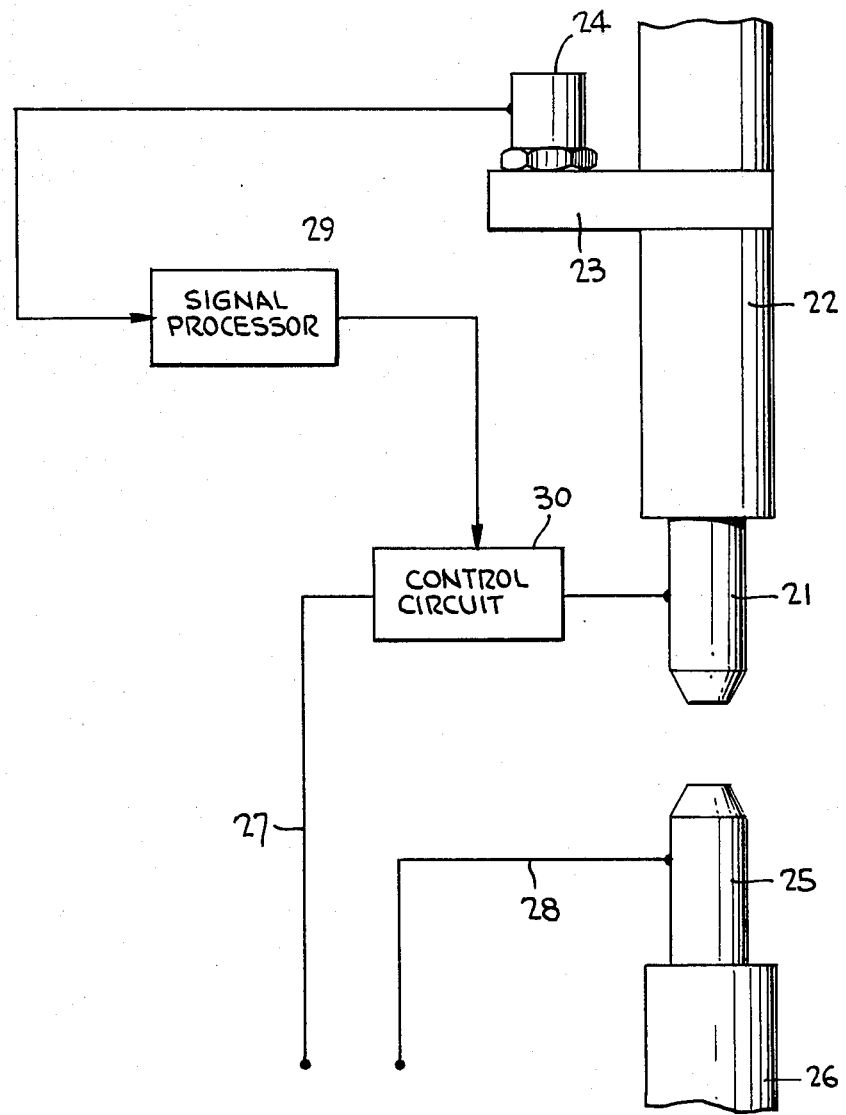
FIG. 5 shows a schematic illustration of how the welding power is adjusted in response to electrode acceleration.

FIG. 5 illustrates schematically a circuit whereby the welding power is controlled in response to acceleration of an electrode. Specifically, a welding electrode 21 is mounted on a vertically movable electrode support 22. Support 22 is provided with a fixing flange 23 for an accelerometer 24 designed to measure acceleration in the direction of the axis of the electrode support 22 (in the vertical direction). A fixed electrode 25 is axially aligned with electrode 21 and is supported in support 26. Electrical power is supplied to electrodes 21 and 25 via leads 27 and 28, respectively, across which a suitable supply voltage is connected. One of the leads, for example lead 27, passes through a control circuit 30 where the voltage applied to electrode 21 can be varied in response to the level of a signal supplied by signal processor 29. Signal processor 29 in turn receives the output signal from accelerometer 24.

Signal processor 29 may adjust the applied voltage at control circuit 30 in such a way as to maintain the percentage of flash-affected welds within given, previously fixed, limits, this adjustment being carried out as follows: the percentage of flash in a certain number of welds is calculated; if this percentage is lower than the lower limit, the electrical power is increased; if the percentage is higher than the upper limit, the electrical power is decreased.

I claim:

1. A method of monitoring the operation of a resistance welding machine having two electrode supports and two electrodes mounted on the respective supports, means for supplying electrical power to the electrodes, and means for applying pressure along a given axis via the supports and the electrodes to members being welded together between the electrodes, the method comprising the steps of making a series of welds, detecting—during each period in which electrical power is supplied to the electrodes—whether the weld is subject to flash, determining the frequency with which flash occurs in the series of welds, determining the quality of the operation of the machine as a function of the frequency of occurrence of flash, and adjusting the electrical power in such a way as to maintain the frequency of occurrence of flash within given limits, by increasing the power if the frequency is below a given lower limit and by decreasing the power if the frequency is above a given upper limit.

2. A method as claimed in claim 1, in which flash is detected by measuring the acceleration of at least one of the electrode supports.

3. A method as claimed in claim 2, in which the acceleration of one electrode support relative to the other is measured by measuring the acceleration of both electrode supports and determining the difference between the acceleration so measured.

4. A method as claimed in claim 2, in which the acceleration is measured in a direction parallel to the said given axis.

5. A method as claimed in claim 1, in which the adjustment of the power is carried out within predetermined limits.

6. A method as claimed in claim 1, in which the power is adjusted to a value just lower than that at which flash occurs.

7. A method as claimed in claim 1, in which the value of the power at which flash occurs is calculated periodically and the power is set at this value decreased by a given safety margin.

8. A method as claimed in claim 1, in which the detection of flash is delayed until an initial part of the welding period has elapsed.

9. A method as claimed in claim 1, in which the frequency of occurrence of flash is determined as the proportion of flash-affected welds in a given number of successive welds.

* * * * *